Feb. 23, 1932.  A. MEYER  1,846,565

CASING FOR MACHINES SUBJECT TO HIGH PRESSURE

Filed May 21, 1928

A. Meyer
INVENTOR

By: Marks & Clerk
Attys.

Patented Feb. 23, 1932

1,846,565

UNITED STATES PATENT OFFICE

ADOLF MEYER, OF KUSNACHT, HAUS ZUR HAAB, SWITZERLAND, ASSIGNOR TO AKTIENGESELLSCHAFT BROWN, BOVERI AND CIE., OF BADEN, SWITZERLAND

CASING FOR MACHINES SUBJECT TO HIGH PRESSURE

Application filed May 21, 1928, Serial No. 279,560, and in Germany May 27, 1927.

With machines which are subjected to high pressures and high temperatures it is difficult to make the screw connection with its flanges and bolts required for dividing the casing longitudinally of such dimensions that the tightness of the casing joint is ensured. For this reason such machines have in many cases been made without a longitudinal joint, which however makes them considerably more difficult to assemble and still more interferes with the removal of the internal parts.

The present invention has for its object to make this very desirable division into two parts possible even in the case of machines subjected to high pressures. This is effected by the high pressure casing which is divided in a longitudinal plane being held together by one or more rings. The rings are given the necessary tension for making the joint tight either by the heating up of the casing itself or by a difference in temperature between the ring and the casing.

For this there are two solutions. Either the ring is made of a material, the co-efficient of expansion of which differs to such an extent from that of the casing that at the working temperature the required state of stress prevails, or provision is made that, when the machine is in operation, the rings are colder than the casing. In both cases, when in the cold state, the rings may be entirely or almost entirely free from stress.

Figure 1:
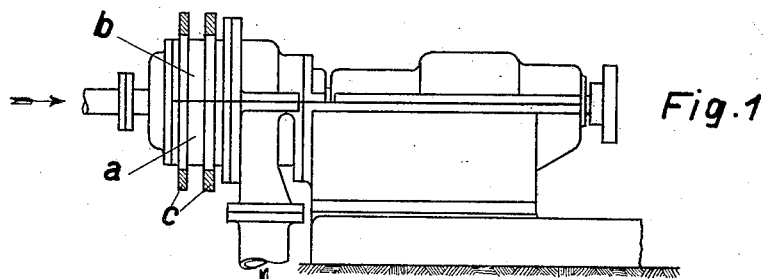
Figure 2:
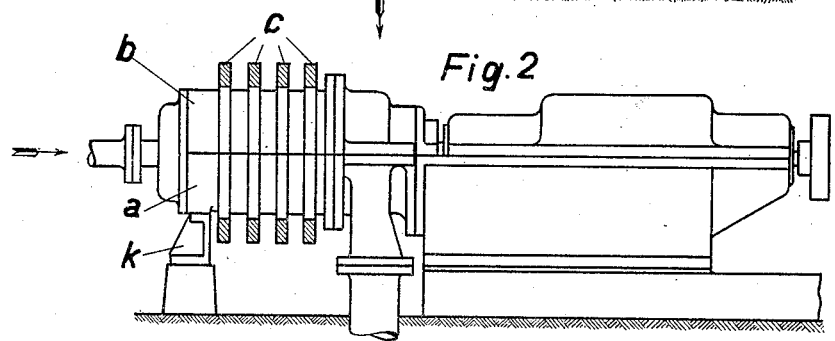
Figure 3:
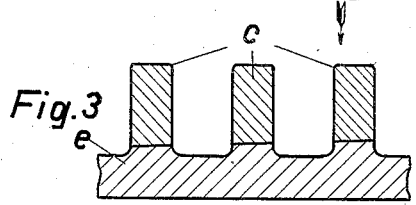
Figure 4:
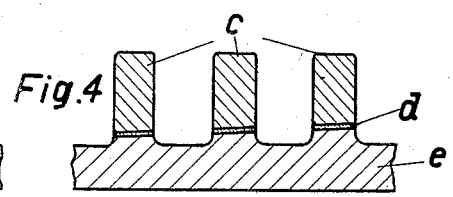
Figure 5:
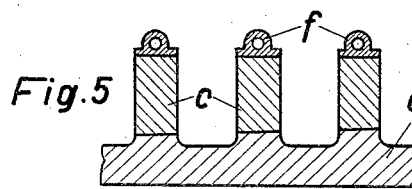
Figure 6:
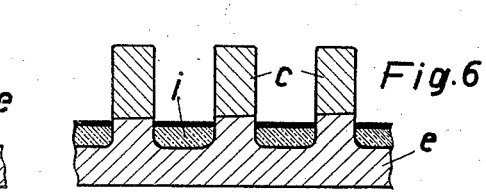
Figure 7:
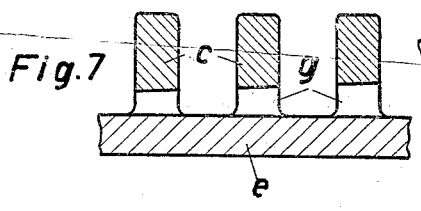
Figure 8:
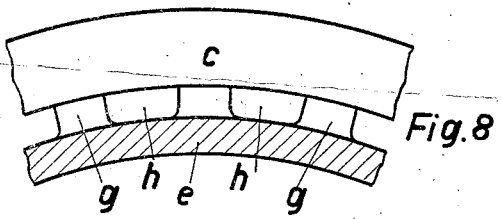

Various constructional examples of the invention are shown in the accompanying drawings, in which Figure 1 shows the invention as applied to a divided high pressure casing supported at one end, Figure 2 as applied to a casing supported at both ends, Fig. 3 shows the clamping rings shrunk directly on the casing, Fig. 4 shows an insulating layer between clamping ring and casing, Fig. 5 means for artificially cooling the rings, Fig. 6 shows the casing protected by insulation against the radiation of heat, Fig. 7 shows the clamping rings shrunk on projecting ribs, portions of which are cut away and Fig. 8 is an end elevation of Fig. 7.

If the ring is to be made of a material the co-efficient of expansion of which differs from that of the casing to such an extent that at the working temperature the desired state of stress will prevail, the rings $c$ (Fig. 3) may suitably be made, for instance, of high per cent. nickel steel which, as is well known, has a considerably smaller co-efficient of expansion than ordinary steel or cast steel, from which the casing $e$ is made.

In constructional forms of the second kind the requisite difference in temperature between the casing $e$ and the ring $c$ may be obtained according to Figure 4 by providing a suitable insulation $d$ between the ring and the casing. Such an insulating effect may also be obtained by letting the clamping rings $c$ rest in accordance with Figures 7 and 8 on projecting ribs $g$, whereby the transmission of heat is greatly obstructed both through the reduction in the seating surface and through the layer of air produced between the ribs $g$ in the perforations $h$. According to Figure 5 the requisite difference in temperature can be maintained by separate cooling means $f$, for instance by cooling coils, through which water flows, the cooling being controlled by the difference in temperature itself, thermo-elements being for instance provided on the ring and the casing, by which the cooling is automatically regulated. Means may also be provided for utilizing natural cooling for keeping the rings suitably cooler than the casing, for instance by enveloping the casing $e$ with an insulating layer $i$, while the clamping rings $c$ are swept over by air. The clamping rings may be conical, so that, by being driven on, they will be given an initial stress, but in this case the cone must be self-locking. The placing in position and the removal of the rings may be facilitated by the casing being supported on one side only, as in Fig. 1. This can be done all the more readily, when in the casing there is a considerable drop in pressure from one end to the other, the unsupported end then being the high pressure end.

The bearing at the high pressure end may be supported, as shown in Fig. 2, in such a manner that by removing the support k the rings can be placed in position.

In most machines which are subjected to high pressures, such as gas and steam turbines, the casing is not subject to any pressure or only to a low pressure when the machine is running idle. In this case a small initial stressing of the rings is sufficient for keeping the machine joint tight while starting. On the other hand, even when starting, the machine receives the operating medium at full temperature, so that it rapidly becomes heated up to the working temperature, without being brought up to the corresponding pressure. Thus, rings will be in a state of working tension before the machine is under pressure, so that the machine is ready to take up the high pressures which only become operative when the machine is under load. The same applies when stopping, where, owing to the slow cooling, the rings will for a long time remain in a state of working tension after the pressures have already become so much lower, through the load being removed from the driven machine, that this state of tension would no longer be required. If a machine which for instance works against back pressure is already under this back pressure when being started, i. e. while in the cold state, either the initial stressing of the rings may be made somewhat greater or an auxiliary screw connection may be provided, which is only designed for this far smaller back pressure.

The retaining ring may also be made in the form of an external casing.

As a difference in temperature between the ring and the casing of for instance 100° C. will constitute at all diameters a difference in expansion of about 1/1000, in steel rings having a modulus of elasticity of 2,200,000 there will be a stress of 2,200 kg./cm.$^2$ acting so as to produce a tight joint.

What I claim is:

1. A casing for machines subject to high pressures and temperatures wherein parts of the casing are jointed in a horizontal plane and held together by a clamping ring which is a push fit upon the assembled parts of the casing and wherein a state of tension sufficient to keep the joint of the casing tight when the machine is under load and the casing is thereby heated is produced by a difference in temperature between the said ring and said casing, including means for keeping the ring cooler than the casing.

2. A casing for machines as claimed in claim 1 wherein the means for keeping the ring cooler than the casing comprises a device tending to prevent conduction of heat from the casing to the ring.

3. A casing for machines as claimed in claim 1 wherein the means for keeping the ring cooler than the casing comprises a series of longitudinal ribs on the casing on the outer surfaces of which the surface coacting with the ring is formed.

In testimony whereof I have signed my name to this specification.

ADOLF MEYER.